US012665696B2

(12) United States Patent
Mu

(10) Patent No.: US 12,665,696 B2
(45) Date of Patent: Jun. 23, 2026

(54) MODULATION AND CODING SCHEME (MCS) TABLE CONFIGURATION METHOD AND DEVICE, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 393 days.

(21) Appl. No.: 18/044,153

(22) PCT Filed: Sep. 10, 2020

(86) PCT No.: PCT/CN2020/114605
§ 371 (c)(1),
(2) Date: Mar. 6, 2023

(87) PCT Pub. No.: WO2022/052005
PCT Pub. Date: Mar. 17, 2022

(65) Prior Publication Data
US 2023/0318735 A1 Oct. 5, 2023

(51) Int. Cl.
*H04L 1/00* (2006.01)
*H04L 1/18* (2023.01)
*H04W 72/23* (2023.01)

(52) U.S. Cl.
CPC .............. *H04L 1/0003* (2013.01); *H04L 1/18* (2013.01); *H04W 72/23* (2023.01)

(58) Field of Classification Search
CPC ....... H04L 1/00; H04L 1/0003; H04L 1/0009; H04L 1/0016; H04L 1/0031; H04L 1/18; H04L 1/1896; H04W 72/23
See application file for complete search history.

(56) References Cited

U.S. PATENT DOCUMENTS

| | | | | |
|---|---|---|---|---|
| 9,479,287 B2 * | 10/2016 | Yang | ....................... | H04L 27/36 |
| 9,750,030 B2 * | 8/2017 | Barbieri | ................ | H04L 1/0003 |
| 9,871,618 B2 * | 1/2018 | Yang | ..................... | H04L 1/0026 |
| 10,050,819 B2 * | 8/2018 | Chen | ....................... | H04L 67/04 |
| 10,103,838 B2 * | 10/2018 | Yang | .................... | H04L 1/0026 |
| 10,225,041 B2 * | 3/2019 | Chen | .................... | H04L 1/0025 |

(Continued)

FOREIGN PATENT DOCUMENTS

| | | |
|---|---|---|
| CN | 104919772 A | 9/2015 |
| CN | 106713193 A | 5/2017 |

(Continued)

OTHER PUBLICATIONS

International Search Report of International Application No. PCT/CN2020/114605, issued Jun. 9, 2021, 2 pages.

(Continued)

*Primary Examiner* — Eric Nowlin
(74) *Attorney, Agent, or Firm* — Finnegan, Henderson, Farabow, Garrett & Dunner, L.L.P.

(57) ABSTRACT
A method for configuring a modulation and coding scheme (MCS) table is performed by a terminal, and includes: determining to use at least one of a first MCS table subset or a second MCS table subset in response to meeting a first condition; wherein the first MCS table subset is at least a part of a table in a first MCS table, and the second MCS table subset is at least a part of a table in a second MCS table.

19 Claims, 3 Drawing Sheets

(56) References Cited

U.S. PATENT DOCUMENTS

| | | | | |
|---|---|---|---|---|
| 10,492,212 B1 * | 11/2019 | Nammi | H04W 72/20 |
| 10,530,522 B2 * | 1/2020 | Yang | H04L 1/0025 |
| 10,693,584 B2 * | 6/2020 | Marinier | H04W 72/23 |
| 10,931,397 B2 * | 2/2021 | Wang | H04L 1/0017 |
| 10,980,044 B2 * | 4/2021 | Rico Alvarino | H04L 1/0003 |
| 10,999,861 B2 * | 5/2021 | Rico Alvarino | H04L 1/0013 |
| 11,191,089 B2 * | 11/2021 | Nammi | H04W 72/54 |
| 11,258,532 B2 * | 2/2022 | Park | H04W 4/70 |
| 11,265,912 B2 * | 3/2022 | Goto | H04L 1/0025 |
| 11,271,672 B2 * | 3/2022 | Yang | H04L 1/0016 |
| 11,309,988 B2 * | 4/2022 | Marinier | H04L 5/0044 |
| 11,329,758 B2 * | 5/2022 | Ma | H04L 27/34 |
| 11,349,593 B2 * | 5/2022 | Park | H04W 72/23 |
| 11,569,930 B2 * | 1/2023 | Wang | H04L 1/0013 |
| 11,616,619 B2 * | 3/2023 | Maki | H04L 1/0009 |
| | | | 370/329 |
| 11,758,554 B2 * | 9/2023 | Pelletier | H04W 72/569 |
| | | | 370/329 |
| 12,127,216 B2 * | 10/2024 | Sengupta | H04L 1/1896 |
| 12,278,699 B2 * | 4/2025 | Mu | H04L 1/0025 |
| 2013/0016694 A1 * | 1/2013 | Nimbalker | H04L 1/0016 |
| | | | 370/330 |
| 2013/0033989 A1 * | 2/2013 | Barbieri | H04L 1/0003 |
| | | | 370/242 |
| 2015/0016553 A1 * | 1/2015 | Yang | H04L 1/0016 |
| | | | 375/261 |
| 2016/0183105 A1 * | 6/2016 | Jiang | H04W 72/541 |
| | | | 370/296 |
| 2017/0012735 A1 * | 1/2017 | Yang | H04L 1/0025 |
| 2017/0171014 A1 * | 6/2017 | Chen | H04L 1/0003 |
| 2017/0207878 A1 * | 7/2017 | Chen | H04L 5/0096 |
| 2018/0123729 A1 * | 5/2018 | Yang | H04L 1/0025 |
| 2019/0044644 A1 * | 2/2019 | Yang | H04L 27/36 |
| 2020/0021391 A1 * | 1/2020 | Rico Alvarino | H04W 8/24 |
| 2020/0022163 A1 * | 1/2020 | Rico Alvarino | H04L 27/0008 |
| 2020/0045716 A1 * | 2/2020 | Nammi | H04W 72/20 |
| 2020/0084778 A1 * | 3/2020 | Wang | H04W 72/0473 |
| 2020/0099467 A1 * | 3/2020 | Wang | H04L 1/0013 |
| 2020/0145127 A1 * | 5/2020 | Yang | H04L 1/0016 |
| 2020/0280389 A1 * | 9/2020 | Ma | H04L 1/0009 |
| 2020/0287657 A1 * | 9/2020 | Marinier | H04L 1/0016 |
| 2021/0013991 A1 * | 1/2021 | Park | H04L 5/0091 |
| 2021/0076409 A1 * | 3/2021 | Goto | H04W 72/1268 |
| 2021/0250964 A1 * | 8/2021 | Rico Alvarino | H04W 76/27 |
| 2021/0250970 A1 * | 8/2021 | Ekpenyong | H04L 5/0094 |
| 2021/0266953 A1 * | 8/2021 | Pelletier | H04W 72/1268 |
| 2021/0273759 A1 * | 9/2021 | Maki | H04L 1/0003 |
| 2021/0298052 A1 * | 9/2021 | Namba | H04L 1/1851 |
| 2023/0127731 A1 * | 4/2023 | Yuan | H04W 72/23 |
| | | | 370/329 |
| 2023/0140970 A1 * | 5/2023 | Lin | H04L 1/189 |
| | | | 370/329 |
| 2023/0156718 A1 * | 5/2023 | Sengupta | H04W 72/23 |
| | | | 370/329 |
| 2023/0224930 A1 * | 7/2023 | Huang | H04L 1/08 |
| | | | 370/312 |
| 2023/0318735 A1 * | 10/2023 | Mu | H04L 1/0003 |
| | | | 370/329 |
| 2024/0146441 A1 * | 5/2024 | Park | H04W 72/0466 |
| 2024/0397518 A1 * | 11/2024 | Elshafie | H04L 1/001 |

FOREIGN PATENT DOCUMENTS

| | | | | | |
|---|---|---|---|---|---|
| CN | 108463961 A | * | 8/2018 | | H04W 72/21 |
| CN | 112119601 A | * | 12/2020 | | H04W 72/23 |
| CN | 108463961 B | * | 1/2021 | | H04W 72/21 |
| EP | 3771120 A1 | * | 1/2021 | | H04W 72/23 |
| KR | 20190129491 A | * | 11/2019 | | H04W 72/23 |
| KR | 102542993 B1 | * | 6/2023 | | H04L 5/0007 |
| TW | I708493 B | * | 10/2020 | | H04W 72/23 |
| WO | WO-2017123337 A1 | * | 7/2017 | | H04W 72/21 |
| WO | WO-2019216588 A1 | * | 11/2019 | | H04W 72/23 |

OTHER PUBLICATIONS

InterDigital Inc., On PDCCH Enhancements for eURLLC, 3GPP TSG RAN WG1 #97, R1-1907110, Reno, USA, Apr. 13-17, 2019. 3 pages.

* cited by examiner

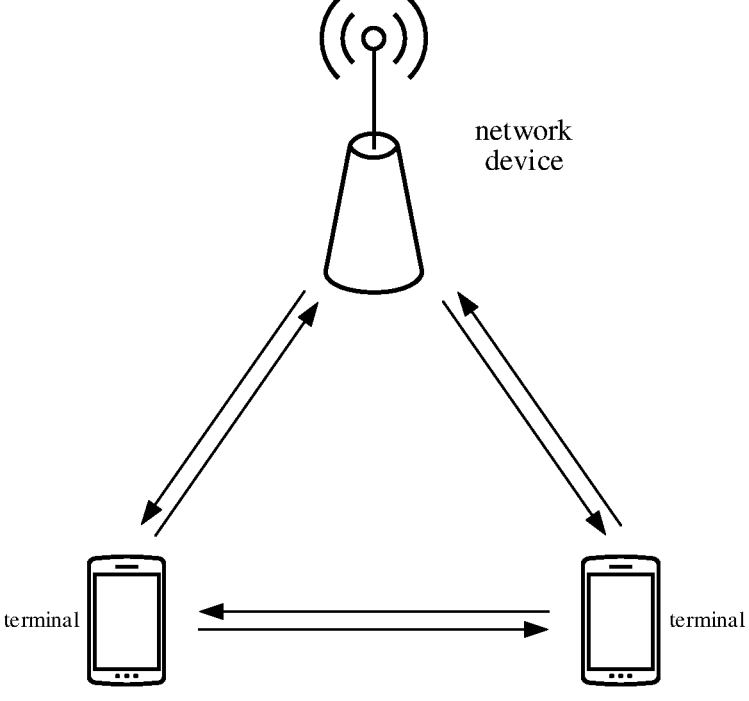
network
device
terminal    terminal
FIG. 1
in response to a situation that a first condition is satisfied,
determine to use a first MCS table subset or a second MCS table
subset
S11
FIG. 2
100
101
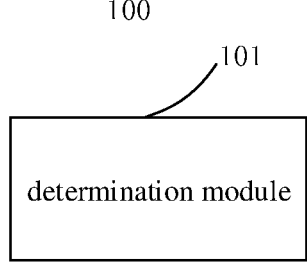
determination module
FIG. 3

MODULATION AND CODING SCHEME (MCS) TABLE CONFIGURATION METHOD AND DEVICE, AND STORAGE MEDIUM

CROSS-REFERENCE TO RELATED APPLICATIONS

The present application is a U.S. National Stage of International Application No. PCT/CN2020/114605, filed on Sep. 10, 2020, the entire content of which is incorporated herein by reference.

TECHNICAL FIELD

The present disclosure relates to a field of communication technology, and more particularly, to a method, an apparatus, and a storage medium for configuring a modulation and coding scheme MCS table.

BACKGROUND

In a communication technology system, Machine Type Communication (MTC) and Narrow Band Internet of Things (NB-IoT) technologies are proposed for low-rate and high-latency scenarios the Internet of Things business.

SUMMARY

The present disclosure provides a method, an apparatus, and a storage medium for configuring a modulation and coding scheme MCS table.

According to a first aspect of embodiments of the present disclosure, a method for configuring a modulation and coding scheme MCS table, the method is performed by a terminal and includes:

determining to use at least one of a first MCS table subset or a second MCS table subset in response to meeting a first condition; wherein the first MCS table subset is at least a part of a table in a first MCS table, and the second MCS table subset is at least a part of a table in a second MCS table.

According to a second aspect of embodiments of the present disclosure, a terminal is provided and includes:

a processor; and a memory configured to store instructions executable by the processor, wherein the processor is configured to:

determine to use at least one of a first MCS table subset or a second MCS table subset in response to meeting a first condition; wherein the first MCS table subset is at least a part of a table in a first MCS table, and the second MCS table subset is at least a part of a table in a second MCS table.

According to a third aspect of embodiments of the present disclosure, a non-transitory computer-readable storage medium is provided, the non-transitory computer-readable storage medium has stored therein instructions that, when executed by a processor of a terminal, cause the terminal to perform a method for configuring the modulation and coding scheme MCS table, the method including:

determining to use at least one of a first MCS table subset or a second MCS table subset in response to meeting a first condition; wherein the first MCS table subset is at least a part of a table in a first MCS table, and the second MCS table subset is at least a part of a table in a second MCS table.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the present disclosure.

FIG. 1 is a communication system architecture diagram of a network device and a terminal according to an embodiment.

FIG. 2 is a flowchart of a method for configuring a modulation and coding scheme MCS table shown according to an embodiment.

FIG. 3 is a block diagram of an apparatus for configuring a modulation and coding scheme MCS table shown according to an embodiment.

DETAILED DESCRIPTION

Figure 4:
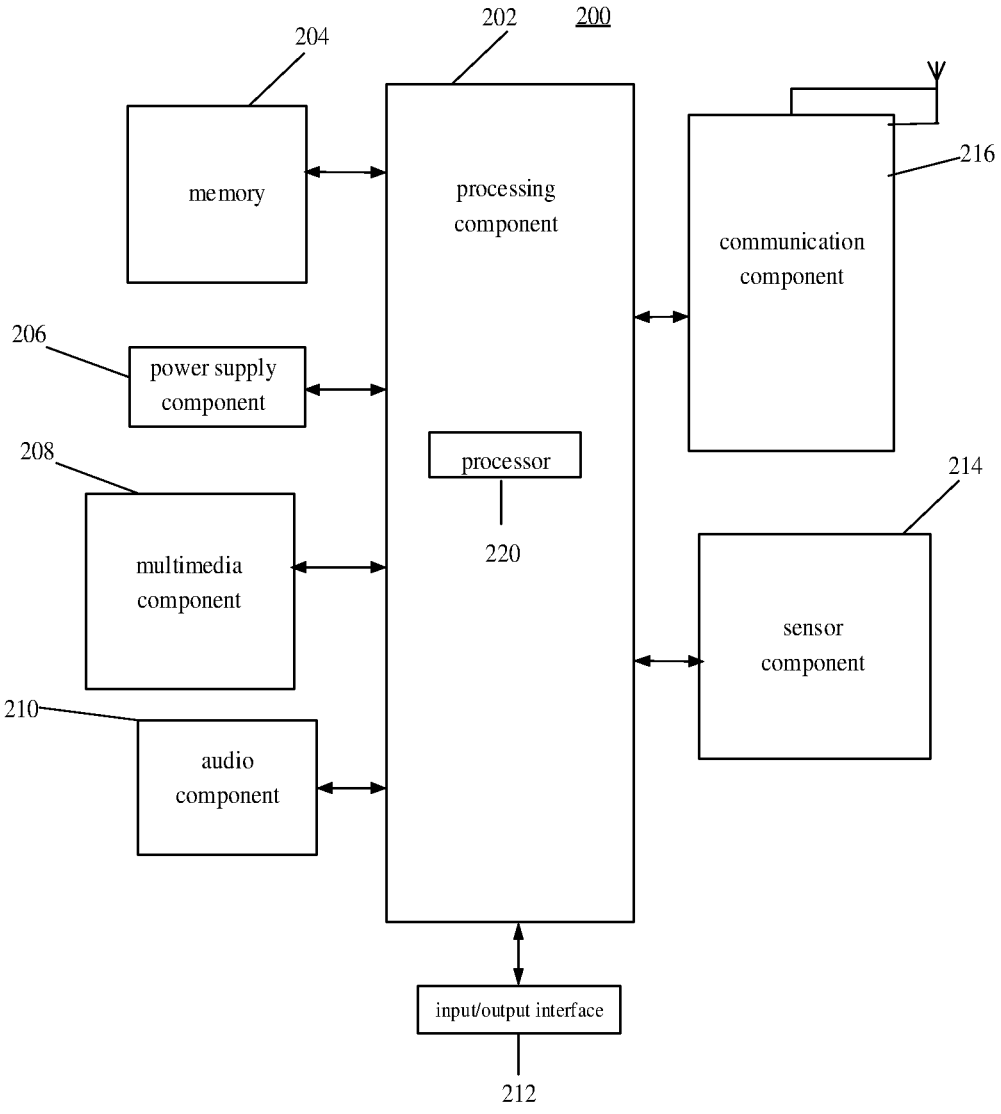
FIG. 4 is a block diagram of an apparatus illustrated according to an embodiment.

Embodiments will be described in detail here, and examples thereof are shown in the accompanying drawings. The following description refers to the accompanying drawings in which the same reference numeral in different drawings represents the same or similar elements unless otherwise represented. The implementations set forth in the following description of embodiments do not represent all implementations consistent with the present disclosure. Instead, they are merely examples of apparatus and method consistent with aspects related to the present disclosure as recited in the appended claims.

Due to development of the Internet of Things business, the MTC and NB-IoT technologies fails to meet a current demand of the Internet of Things business for rate and latency. Thus, a new reduced capacity UE, or NR-lite for short, is designed to cover business requirements of the Internet of Things. Moreover, a coverage enhancement measure is adopted for a coverage loss caused by the terminal capability limitation. For terminals requiring the coverage enhancement, two modulation and coding scheme (MCS) tables may be used, and corresponding MCS tables may be used in different situations. However, the two tables have overlapping code rates, and there is information redundancy during use of code rates when the coverage enhancement is performed.

In a communication system, MTC and NB-IoT are proposed for low-rate and high-latency scenarios (such as scenarios of meter reading and environmental monitoring) in Internet of Things business. At present, NB-IoT technology may support a highest rate of several hundred K, and MTC may support a highest rate of several M. However, with the continuous development of Internet of Things services (such as services of monitoring, smart home, wearable devices, industrial sensor detection and the like), a rate of tens to 100 M is generally required, and requirements for latency are also relatively high. Thus, in the communication system, the MTC and NB-IoT may no longer meet the requirements of the current Internet of Things business. Therefore, in a new radio of the communication system, it is proposed to design new user equipment to cover the business requirements of a terminal Internet of Things device that requires the rate of tens to 100 M with a relatively high latency. At present, in the standardization of the 3rd Generation Partnership Project (3GPP), the user equipment used to cover the business requirements of the terminal Internet of Things device that requires the rate of tens to 100 M with the relatively high latency is called a Reduced Capability UE (a Redcap terminal or a NR-lite).

On the other hand, the NR-lite generally needs to meet the requirements of low cost, low complexity, a certain degree of coverage enhancement and power saving. However, the new radio communication technology is designed for high-end terminals such as a terminal of high-rate and low-latency, which cannot meet the above requirements of the NR-lite. Therefore, the current new radio communication technology needs to be modified to meet the above requirements of the NR-lite. For example, according to the requirements of low cost and low complexity, a radio frequency (RF) bandwidth of the new radio Internet of Things may be limited (for example, to 5 MHz or 10 MHz; or a size of the NR-lite buffer is limited), thus limiting a size of each received transmission block, and the like. For another example, according to the requirements of power saving, the communication process may be simplified to reduce a number of NR-lite users detecting a downlink control channel.

However, due to limitation of the capacity of the Redcap terminal, the coverage capacity of the Redcap terminal may also be limited, for example, a coverage loss caused by reduction of a receiving antenna. In the related art, coverage enhancement measure, such as retransmission, is adopted for the coverage loss. In other words, the data from the terminal is retransmitted for multiple times, and the configuration of spectral efficiency of the retransmission is achieved by an MCS index. An MCS takes factors such as MCS index, modulation mode, code rate and spectral efficiency as columns of a table and takes the MCS index as rows to form an MCS rate table. Thus, each MCS index actually corresponds to a physical transmission rate under a set of parameters.

In the related art, there are two available MCS tables for terminals with the coverage enhancement. One of the MCS tables is used for coverage enhancement at a terminal with a relatively good channel condition, and the other one of the MCS tables is used for coverage enhancement at a terminal with a relatively poor channel condition or with a relatively high transmission requirement (such as a relatively high code rate requirement). The two available MCS tables are now defined as Table 1 and Table 2. Table 1 is the MCS table with a normal code rate, which is used by the terminal with the relatively good channel condition when performing the coverage enhancement, while Table 2 is the MCS table with a low code rate, which is used by a terminal with the relatively poor channel conditions or with the relatively high transmission requirement when performing the coverage enhancement. In one case, when the terminal performs a unicast data scheduling and is not configured to use a modulation and coding scheme cell radio network temporary identifier (MCS-C-RNTI), Table 1 MCS table is used in this case, and in a corresponding scheduling downlink control information (DCI), cyclic redundancy check (CRC) is scrambled by a cell radio network temporary identifier (C-RNTI). Another case is that when the terminal is configured to use the MCS-C-RNTI, the terminal may use Table 1 MCS table and Table 2 MCS table. In addition, when the downlink control information is scrambled with C-RNTI, and the terminal performs the coverage enhancement, a Table 1 MCS table is used accordingly. When the downlink control information uses IMCS-C-RNTI to scramble CRC, and the terminal performs the coverage enhancement, Table 2 MCS table is used accordingly. Table 1 MCS table is shown in Table 1, and Table 2 MCS table is shown in Table 2.

TABLE 1

| MCS Index $I_{MCS}$ | Modulation mode Modulation Order $Q_m$ | Code rate Target code Rate $R \times [1024]$ | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 2

| MCS Index $I_{MCS}$ | Modulation mode Modulation Order $Q_m$ | Code rate Target code Rate $R \times [1024]$ | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |

TABLE 2-continued

| MCS Index $I_{MCS}$ | Modulation mode Modulation Order $Q_m$ | Code rate Target code Rate R × [1024] | Spectral efficiency Spectral efficiency |
|---|---|---|---|
| 30 | 4 | | reserved |
| 31 | 6 | | reserved |

However, when the terminal with a low capacity Redcap is configured with Table 1 MCS table with the normal code rate and Table 2 MCS table with the low code rate, there is certain information redundancy. One of the reasons for the information redundancy is that the code rates in the Table 1 MCS table and Table 2 MCS table used by the terminal overlap, and the other reason is that a probability of using the Table 1 MCS table with the normal code rate is very small after the terminal is configured to use the Table 2 MCS table with the low code rate.

In view of the above problems involved in the related art, the present disclosure provides a method for configuring a modulation and coding scheme MCS table. Through the method for configuring the modulation and coding scheme MCS table provided by the present disclosure, there is no overlap of code rates in the MCS tables used by the terminal, which may improve the use efficiency of the MCS tables and reduce overhead of the downlink control information. FIG. 1 is a communication system architecture diagram of a network device and a terminal according to an embodiment. The method for configuring the modulation and coding scheme MCS table provided by the present disclosure may be applicable to the communication system architecture diagram shown in FIG. 1. As shown in FIG. 1, a terminal receives an MCS index determined by a network device in the downlink control information, and further determines a code rate and a spectral efficiency used by the terminal when performing the coverage enhancement based on the MCS index.

It may be understood that the communication system between the network device and the terminal shown in FIG. 1 is merely for schematic illustration. The wireless communication system may further include other network devices, such as core network devices, wireless relay devices and wireless backhaul devices, which are not shown in FIG. 1. Embodiments of the present disclosure do not limit the number of network devices and terminals included in the wireless communication system.

It should be further understood that the wireless communication system in embodiments of the present disclosure is a network that provides wireless communication functions. The wireless communication system may use different communication technologies, such as code division multiple access (CDMA), wideband code division multiple access (WCDMA), time division multiple access (TDMA), frequency division multiple access (FDMA) orthogonal frequency-division multiple access (OFDMA), single carrier FDMA (SC-FDMA), or carrier sense multiple access with collision avoidance. Based on capacities, rates, latencies and other factors of different networks, the networks may be grouped into a second generation wireless communication technology (2G), a third generation wireless communication technology (3G), a fourth generation wireless communication technology (4G) or future evolution network such as a fifth generation wireless communication technology (5G). The 5G network may also be referred to as a new radio (NR) network. For the convenience of description, the wireless communication network is sometimes referred to as a network in the present disclosure.

Further, the network device involved in the present disclosure may also be referred to as a wireless access device. The wireless access device may be a base station, an evolved node base station (eNB), a home base station, an access point (AP) in a wireless fidelity (WI-FI) system, a wireless relay node, a wireless backhaul node, a transmission point (TP), a transmission and reception point (TRP), a next generation node base station (gNB) in the NR system, a component or part of a device that constitutes the base station or the like. When it is a vehicle-to-vehicle (V2X) communication system, the network device may also be a vehicle-mounted device. It should be understood that, in embodiments of the present disclosure, the specific technology and specific device form adopted by the network device are not limited.

Further, the terminal involved in the present disclosure may also be referred to as a terminal device, a user equipment (UE), a mobile station (MS), a mobile terminal (MT) or the like, which is a device that provides voice and/or data connectivity for a user. For example, the terminal may be a handheld device or vehicle-mounted device with a wireless connection function. At present, some examples of terminals are mobile phones, pocket personal computers (PPCs), handheld computers, personal digital assistants (PDAs), notebook computers, tablet computers, wearable devices, vehicle-mounted devices or the like. In addition, when it is the V2X communication system, the terminal device may also be a vehicle-mounted device. It should be understood that in embodiments of the disclosure, the specific technology and specific device form adopted by the terminal are not limited.

In an embodiment of the present disclosure, a method for configuring a modulation and coding scheme MCS table is provided.

FIG. 2 is a flowchart of a method for configuring a modulation and coding scheme MCS table shown according to an embodiment. As shown in FIG. 2, the method for configuring a modulation and coding scheme MCS table is applicable to a terminal, including a following step S11.

In the step S11, in response to meeting a first condition, it is determined to use a first MCS table subset or a second MCS table subset.

The first MCS table subset is at least a part of a table in a first MCS table, and the second MCS table subset is at least a part of a table in a second MCS table.

In the embodiments of the present disclosure, the first MCS table subset may select a table where continuous MCS indexes in a first MCS table are located as the first MCS table subset. Or, the first MCS table subset may select a table where discontinuous MCS indexes in a first MCS table are located to form the first MCS table subset. Similarly, for the second MCS table subset, in an implementation, a table where continuous MCS indexes in a second MCS table are located may be selected as the second MCS table subset. Or, a table where discontinuous MCS indexes in a second MCS table are located is selected to form the second MCS table subset. If the terminal meets the first condition, the terminal determines to use the first MCS table subset or the second MCS table subset.

In all embodiments of the present disclosure, the first MCS table subset may select a table corresponding to a part of the MCS indexes in the first MCS table, and add one or more additional MCS indexes as the first MCS table subset. In all embodiments of the present disclosure, the second MCS table subset may select a table corresponding to a part of the MCS indexes in the second MCS table, and add one or more additional MCS indexes as the second MCS table subset. Similar to the foregoing embodiments, rows in the first MCS table subset that are the same as rows in the first MCS table may be continuous or discontinuous in the first MCS table. Similar to the foregoing embodiments, rows in the second MCS table subset that are the same as rows in the second MCS table may be continuous or discontinuous in the second MCS table. In some embodiments of the present disclosure, when the terminal receives an implicit indication sent by the network, the terminal determines to use the first MCS table subset or the second MCS table subset according to the implicit indication. Or, when the terminal receives an indicator of explicit indication sent by the network, the terminal determines to use the first MCS table subset or the second MCS table subset. The implicit indication may be a different scrambling sequence, a different scrambled CRC in DCI, a different preset signaling length, or a different coding manner of preset signaling and the like, to indicate the terminal to use the first MCS table subset or the second MCS table subset in an implicit manner. In other words, the terminal may determine a MCS table subset to be used according to a scrambling sequence sent by the network, or the preset signaling length, or the coding manner of the preset signaling.

In some embodiments of the present disclosure, the terminal determines to use the first MCS table subset or the second MCS table subset according to a received check sequence, used by the DCI to scramble CRC, sent by the network. The check sequences used by different scrambled CRC correspond to different MCS table subsets. Or, the terminal may determine use the first MCS table subset or the second MCS table subset according to a received indicator indicating the MCS table subset used by the terminal.

In some embodiments of the present disclosure, when at least a part of the table from the first MCS table is selected as the first MCS table subset, and at least a part of the table from the second MCS table is selected as the second MCS table subset, a lowest spectral rate corresponding to an MCS index in the first MCS table subset is met, and the lowest spectral rate is greater than a highest spectral rate corresponding to an MCS index in the second MCS table subset.

According to the above Table 1 and Table 2, the embodiments of the present disclosure proposes a method for configuring a modulation and coding scheme MCS table, which indicates the MCS index used in the first MCS table subset or the second MCS table subset through first information field of the DCI. Referring to Table 1 and Table 2, different values of the first information field correspond to different MCS indexes, and each MCS index in the table corresponds to a unique modulation mode, code rate and spectral efficiency. For example, taking each MCS table subset including a table corresponding to 8 MCS indexes as an example, the first MCS table subset includes a table corresponding to MCS indexes that range from MCS #2 to MCS #9, and thus, a spectral efficiency of the table corresponding to the MCS index of MCS #2 in the first MCS table subset is the lowest, which is 0.3770. The second MCS table subset includes a table corresponding to MCS indexes that range from MCS #0 to MCS #7, and a spectral efficiency corresponding to the MCS index MCS #7 in the second MCS table subset is the highest, which is 0.3066. The lowest spectral efficiency of 0.3770 in the first MCS table subset is greater than the highest spectral efficiency of 0.3066 in the second MCS table subset. Of course, these are only illustrative examples, which are not construed as a limitation to the embodiments of the present disclosure.

Or, in some embodiments of the present disclosure, when at least a part of the table is selected in the first MCS table as the first MCS table subset, and at least a part of the table is selected in the second MCS table as the second MCS table subset, a lowest spectral rate corresponding to an MCS index in the first MCS table subset is met, and the lowest spectral rate is equal to a highest spectral rate corresponding to an MCS index in the second MCS table subset. According to the above Table 1 and Table 2, each MCS index in the table corresponds to a unique modulation mode, code rate and spectral efficiency. For example, taking each MCS table subset including an MCS table corresponding to 8 MCS indexes as an example, the first MCS table subset includes an MCS table corresponding to MCS indexes that range from MCS #2 to MCS #9, and thus a spectral efficiency of the MCS table corresponding to the MCS index MCS #2 in the first MCS table subset is the lowest, which is 0.3770. The second MCS table subset includes an MCS tables corresponding to MCS indexes that range from MCS #1 to MCS #8, and a spectral efficiency corresponding to the MCS index of MCS #8 in the second MCS table subset is the highest, which is 0.3770. The lowest spectral efficiency in the first MCS table subset is equal to the highest spectral efficiency in the second MCS table subset is 0.3770. Of course, these are only illustrative examples, which are not construed as a limitation to the embodiments of the present disclosure.

In some embodiments of the present disclosure, the terminal receives the DCI sent by the network and determines the first information field included in the DCI. Taking that the terminal determines to use the first MCS table subset as an example, the first information field of the DCI at least includes a parameter corresponding to at least one MCS index in the first MCS table subset.

For example, if the MCS table included in the first MCS table subset corresponds to one MCS index or two MCS indexes, the first information field of the DCI uses 1 bit parameter to indicate a corresponding MCS index. Taking that two MCS indexes are included as an example, the range of the MCS indexes is MCS #2~MCS #3, 0 is used to correspondingly indicate the MCS index MCS #2, and 1 is used to correspondingly indicate the MCS index MCS #3. If the MCS table included in the first MCS table subset corresponds to 2-4 MCS indexes, the first information field of the DCI uses 2 bit parameters to indicate a corresponding MCS index. Taking 4 MCS indexes are included as an example, the range of the MCS indexes is MCS #2~MCS #5, 00 is used to correspondingly indicate the MCS index MCS #2, 01 is used to correspondingly indicate the MCS index MCS #3, and the rest can be done in the same manner. If the MCS table included in the first MCS table subset corresponds to 4~8 MCS indexes, the first information field of the DCI uses 3 bit parameters to indicate a corresponding MCS index. Taking 8 MCS indexes as an example, the range of the MCS indexes is MCS #2~MCS #9, 000 is used to correspondingly indicate the MCS index MCS #2, 001 is used to correspondingly indicate the MCS index MCS #3, and the rest can be done in the same manner. If the MCS table included in the first MCS table subset corresponds to 8~16 MCS indexes, the first information field uses 4 bit parameters to indicate a corresponding MCS index. For example, if the MCS table included in the first MCS table subset corresponds to 16 MCS indexes, and the range of the MCS indexes is MCS #2~MCS #17, 0000 is used to correspondingly indicate the MCS index MCS #2, 0001 is used to correspondingly indicate the MCS index MCS #3, and the rest can be done in the same manner. Of course, these are only illustrative examples, which are not construed as a limitation to the embodiments of the present disclosure.

In some embodiments of the present disclosure, the terminal receives the DCI sent by the network and determines the first information field included in the DCI. Taking that the terminal determines to use the second MCS table subset as an example, the first information field of the DCI at least includes a parameter corresponding to at least one MCS index in the second MCS table subset.

For example, if the MCS table included in the second MCS table subset corresponds to one MCS index or two MCS indexes, the first information field of the DCI uses 1 bit parameter to indicate a corresponding MCS index. Taking that two MCS indexes are included as an example, the range of the MCS indexes is MCS #2~MCS #3, 0 is used to correspondingly indicate the MCS index MCS #2, and 1 is used to correspondingly indicate the MCS index MCS #3. If the MCS table included in the second MCS table subset corresponds to 2-4 MCS indexes, the first information field of the DCI uses 2 bit parameters to indicate a corresponding MCS index. Taking 4 MCS indexes are included as an example, the range of the MCS indexes is MCS #2~MCS #5, 00 is used to correspondingly indicate the MCS index MCS #2, 01 is used to correspondingly indicate the MCS index MCS #3, and the rest can be done in the same manner. If the MCS table included in the second MCS table subset corresponds to 4~8 MCS indexes, the first information field of the DCI uses 3 bit parameters to indicate a corresponding MCS index. Taking 8 MCS indexes as an example, the range of the MCS indexes is MCS #2~MCS #9, 000 is used to correspondingly indicate the MCS index MCS #2, 001 is used to correspondingly indicate the MCS index MCS #3, and the rest can be done in the same manner. If the MCS table included in the second MCS table subset corresponds to 8~16 MCS indexes, the first information field uses 4 bit parameters to indicate a corresponding MCS index. For example, if the MCS table included in the second MCS table subset corresponds to 16 MCS indexes, and the range of the MCS indexes is MCS #2~MCS #17, 0000 is used to correspondingly indicate the MCS index MCS #2, 0001 is used to correspondingly indicate the MCS index MCS #3, and the rest can be done in the same manner. Of course, these are only illustrative examples, which are not construed as a limitation to the embodiments of the present disclosure.

It may be understood that when defining a relationship between the bit parameter of the first information field and the MCS index, the bit parameter for indicating the MCS index is determined, and the bit parameter of the MCS index and the MCS index have a fixed one-to-one correspondence, as described above. For different MCS table subsets, there may be different mapping relationships between the bit parameter and MCS index. These mapping relationships may be prescribed by a protocol or preconfigured. The terminal may determine the mapping relationship between the bit value inherent in the set and the MCS index by determining the MCS table subset used.

In some embodiments of the present disclosure, the first information field further includes a parameter for indicating a retransmission number. The parameter for indicating the retransmission number may also be a bit, and a quantity of the bit used to indicate the retransmission number is determined according to a quantity of the candidate retransmission numbers included in a corresponding subset of the retransmission number. For example, if the quantity of the candidate retransmission numbers included in the subset of the retransmission number supported by the terminal is 4, 2 bits are used to indicate the retransmission number used by the terminal. If the quantity of the candidate retransmission numbers included in the subset of the retransmission number supported by the terminal is 2, 1 bit is used to indicate the retransmission number used by the terminal.

In the embodiments of the present disclosure, the number of tables corresponding to the MCS indexes that are included in the MCS table subset corresponds to the quantity of the candidate retransmission numbers included in the subset of the retransmission number. For example, if the number of tables corresponding to the MCS indexes included in the MCS table subset is 8 to 16, the quantity of the candidate retransmission numbers included in the subset of the retransmission number is less than or equal to 2. The number of tables corresponding to the MCS indexes included in the MCS table subset is 4 to 8, the quantity of the candidate retransmission numbers included in the subset of the retransmission number is less than or equal to 4. The number of tables corresponding to the MCS indexes included in the MCS table subset is 2 to 4, the quantity of the candidate retransmission numbers included in the subset of the retransmission number is less than or equal to 8. The number of tables corresponding to the MCS indexes included in the MCS table subset is 1 to 2, and the quantity of the candidate retransmission numbers included in the subset of the retransmission number is less than or equal to 16.

In some embodiments of the present disclosure, the number of indexes included in the first MCS table subset may be the same as the number of indexes included in the second MCS table subset. Thus, the quantity of the candidate retransmission numbers included in a subset of a first retransmission number set corresponding to the first MCS table subset is the same as the quantity of the candidate retransmission numbers included in a subset of a second retransmission number set corresponding to the second MCS table subset. In other embodiments of the present disclosure, the number of indexes included in the first MCS table subset may be different from the number of indexes included in the second MCS table subset. Thus, the quantity of the candidate retransmission numbers included in a subset of a first retransmission number set corresponding to the first MCS table subset is different from the quantity of the candidate retransmission numbers included in a subset of a second retransmission number set corresponding to the second MCS table subset. For example, the first MCS table subset may include 8 MCS indexes, and the subset of the first retransmission number set corresponding to the first MCS table subset includes 4 candidate retransmission numbers. The first information field uses 3 bits to indicate the MCS indexes used and 2 bits to indicate the retransmission number used. The second MCS table subset may include 16 MCS indexes, and the subset of the second retransmission number set corresponding to the second MCS table subset includes 2 candidate retransmission numbers. The first information field uses 4 bits to indicate the MCS indexes used and uses 1 bit to indicate the retransmission number used.

In the embodiment of the present disclosure, the preset first condition includes one or a combination of following conditions:

the MCS table subset to be used by the terminal being configured by a network side;

the terminal using a coverage enhancement function;

the terminal being of a first terminal type;

the terminal being of a first terminal type and using a first cell radio network temporary identifier for downlink control signaling scrambling. The first terminal type may be a Redcap terminal, and the first cell radio network temporary identifier is a modulation and coding scheme cell radio network temporary identifier MCS-C-RNTI.

In the embodiments of the present disclosure, the MCS table subset to be used by the terminal being configured by the network side may be understood as that: the network configures the terminal to use a first MCS table full-set or configures the terminal to use the first MCS table subset, the network configures the terminal to use a second MCS table full-set or configures the terminal to use the second MCS table subset, and the terminal may use the corresponding first MCS table subset or the corresponding second MCS table subset. The terminal using the coverage enhancement function may be understood as that: when the network side configures the terminal to use the coverage enhancement function, the corresponding first MCS table subset or the corresponding second MCS table subset may be used.

Or, when the terminal is the first type terminal, the corresponding first MCS table subset or the corresponding second MCS table subset may be used. Another case is that when the terminal is the first terminal type and uses the first cell radio network temporary identifier for the downlink control signaling scrambling, the corresponding first MCS table subset or the second MCS table subset is used.

In the embodiment of the present disclosure, the use of the first MCS table subset or the second MCS table subset may be determined according to a sequence used for scrambling CRC in the downlink control information (DCI). In other words, when DCI scrambles the CRC with different check sequences, different MCS table subsets are used correspondingly.

Further, the terminal determines to use the first MCS table subset in response to that the DCI scrambles the CRC using a cell radio network temporary identifier C-RNTI. The terminal determines to use the second MCS table subset in response to that the DCI scrambles CRC using the modulation and coding scheme cell radio network temporary identifier MCS-C-RNTI.

In another embodiment of the present disclosure, a method for configuring a modulation and coding scheme MCS table is provided.

The terminal determines to use a first MCS table subset in response to meeting a first condition. The first MCS table subset is at least a part of a table in a first MCS table. It is further understood that the first MCS table subset may select a table where continuous MCS indexes in a first MCS table are located as the first MCS table subset. Or, the first MCS table subset may select a table where discontinuous MCS indexes in the first MCS table are located to form the first MCS table subset.

In all embodiments of the present disclosure, the first MCS table subset may select a table corresponding to a part of the MCS indexes in the first MCS table, and add one or more additional MCS indexes as the first MCS table subset. Similar to the foregoing embodiments, rows in the first MCS table subset that are the same as rows in the first MCS table may be continuous or discontinuous in the first MCS table.

In some embodiments of the present disclosure, when the terminal receives an implicit indication sent by the network, the terminal determines to use the first MCS table subset according to the implicit indication. Or, when the terminal receives an indicator of an explicit indication sent by the network, the terminal determines to use the first MCS table subset. The implicit indication may be a specific scrambling sequence, or a DCI with specific scrambled CRC, or a specific preset signaling length, or a specific coding manner of preset signaling, and the like, to indicate the terminal to use the first MCS table subset in an implicit manner. In other words, the terminal may use the first MCS table subset according to the scrambling sequence sent by the network, or the preset signaling length, or the coding manner of the preset signaling.

In some embodiments of the present disclosure, the terminal may also determine to use the first MCS table subset according to a received check sequence, used by the DCI to scramble CRC, sent by the network.

In some embodiments of the present disclosure, when at least a part of a table from the first MCS table is selected as a first MCS table subset. The first MCS table may be referred to the above Table 1. Each MCS index in the table corresponds to a unique modulation mode, code rate and spectral efficiency. For example, taking the first MCS table subset including a table corresponding to 8 MCS indexes as an example, if the first MCS table subset includes a table corresponding to MCS indexes that range from MCS #2 to MCS #9, a spectral efficiency of the table corresponding to MCS index MCS #2 in the first MCS table subset is the lowest, which is 0.3770, and a spectral efficiency of the table corresponding to MCS index MCS #9 in the first MCS table subset is the highest, which is 1.3262. The terminal may choose from the spectral efficiency ranging from 0.3770~1.3262 according to the received indications. Of course, these are only illustrative examples, which are not construed as a limitation to the embodiments of the present disclosure.

In some embodiments of the present disclosure, the terminal receives the DCI sent by the network and determines the first information field included in the DCI. The first information field of the DCI at least includes a parameter corresponding to at least one MCS index in the first MCS table subset.

For example, if the MCS table included in the first MCS table subset corresponds to one MCS index or two MCS indexes, the first information field of the DCI uses 1 bit parameter to indicate a corresponding MCS index. Taking that two MCS indexes are included as an example, the range of the MCS indexes is MCS #2~MCS #3, 0 is used to correspondingly indicate the MCS index MCS #2, and 1 is used to correspondingly indicate the MCS index MCS #3. If the MCS table included in the first MCS table subset corresponds to 2-4 MCS indexes, the first information field of the DCI uses 2 bit parameters to indicate a corresponding MCS index. Taking 4 MCS indexes are included as an example, the range of the MCS indexes is MCS #2~MCS #5, 00 is used to correspondingly indicate the MCS index MCS #2, 01 is used to correspondingly indicate the MCS index MCS #3, and the rest can be done in the same manner. If the MCS table included in the first MCS table subset corresponds to 4~8 MCS indexes, the first information field of the DCI uses 3 bit parameters to indicate a corresponding MCS index. Taking 8 MCS indexes as an example, the range of the MCS indexes is MCS #2~MCS #9, 000 is used to correspondingly indicate the MCS index MCS #2, 001 is used to correspondingly indicate the MCS index MCS #3, and the rest can be done in the same manner. If the MCS table included in the first MCS table subset corresponds to 8~16 MCS indexes, the first information field uses 4 bit parameters to indicate a corresponding MCS index. For example, if the MCS table included in the first MCS table subset corresponds to 16 MCS indexes, and the range of the MCS indexes is MCS #2~MCS #17, 0000 is used to correspondingly indicate the MCS index MCS #2, 0001 is used to correspondingly indicate the MCS index MCS #3, and the rest can be done in the same manner. Of course, these are only illustrative examples, which are not construed as a limitation to the embodiments of the present disclosure.

It may be understood that when defining a relationship between the bit parameter of the first information field and the MCS index, the bit parameter for indicating the MCS index is determined, and the bit parameter of the MCS index and the MCS index have a fixed one-to-one correspondence, as described above. For different MCS table subsets, there may be different mapping relationships between the bit parameter and MCS index. These mapping relationships may be prescribed by a protocol or preconfigured. The terminal may determine the mapping relationship between the bit value inherent in the set and the MCS index by determining the MCS table subset used.

In some embodiments of the present disclosure, the first information field further includes a parameter for indicating a retransmission number. The parameter for indicating the retransmission number may also be a bit, and a quantity of the bit used to indicate the retransmission number is determined according to a quantity of candidate retransmission numbers included in a corresponding subset of the retransmission number. For example, if the quantity of the candidate retransmission numbers included in the subset of the retransmission number supported by the terminal is 4, 2 bits are used to indicate the retransmission number used by the terminal. If the quantity of the candidate retransmission numbers included in the subset of the retransmission number supported by the terminal is 2, 1 bit is used to indicate the retransmission number used by the terminal.

In the embodiments of the present disclosure, the number of tables corresponding to the MCS indexes that are included in the first MCS table subset corresponds to the quantity of the candidate retransmission numbers included in the subset of the first retransmission number set. For example, if the number of tables corresponding to the MCS indexes included in the first MCS table subset is 8 to 16, the quantity of the candidate retransmission numbers included in the subset of the first retransmission number set is less than or equal to 2. The number of tables corresponding to the MCS indexes included in the first MCS table subset is 4 to 8, the quantity of the candidate retransmission numbers included in the subset of the first retransmission number set is less than or equal to 4. The number of tables corresponding to the MCS indexes included in the first MCS table subset is 2 to 4, the quantity of the candidate retransmission numbers included in the subset of the first retransmission number set is less than or equal to 8. The number of tables corresponding to the MCS indexes included in the first MCS table subset is 1 to 2, and the quantity of the candidate retransmission numbers included in the subset of the first retransmission number set is less than or equal to 16.

For example, the first MCS table subset may include 8 MCS indexes, and the subset of the first retransmission number set corresponding to the first MCS table subset includes 4 candidate retransmission numbers. The first information field uses 3 bits to indicate the MCS indexes used and 2 bits to indicate the retransmission number used. Or, the first MCS table subset may include 16 MCS indexes, and the subset of the first retransmission number set corresponding to the first MCS table subset includes 2 candidate retransmission numbers. The first information field uses 4 bits to indicate the MCS indexes used and uses 1 bit to indicate the retransmission number used.

In the embodiment of the present disclosure, the preset first condition includes one or a combination of following conditions:

the first MCS table subset to be used by the terminal being configured by a network side;

the terminal using a coverage enhancement function;

the terminal being of a first terminal type;

the terminal being of a first terminal type and using a first cell radio network temporary identifier for downlink control signaling scrambling. The first terminal type may be a Redcap terminal, and the first cell radio network temporary identifier is a modulation and coding scheme cell radio network temporary identifier MCS-C-RNTI.

In the embodiments of the present disclosure, the first MCS table subset to be used by the terminal being configured by the network side may be understood as that: the network configures the terminal to use a first MCS table full-set or configures the terminal to use the first MCS table subset, and the terminal may use the corresponding first MCS table subset. The terminal using the coverage enhancement function may be understood as that: when the network side configures the terminal to use the coverage enhancement function, and when the terminal uses the coverage enhancement function, the corresponding first MCS table subset may be used.

Or, when the terminal is the first type terminal, the corresponding first MCS table subset may be used. Another case is that when the terminal is the first terminal type and uses the first cell radio network temporary identifier for the downlink control signaling scrambling, the terminal determines to use the first MCS table subset in response to that the DCI scrambles the CRC using a cell radio network temporary identifier C-RNTI.

In yet another embodiment of the present disclosure, a method for configuring a modulation and coding scheme MCS table is also provided.

The terminal determines to use a second MCS table subset in response to meeting a first condition. The second MCS table subset is at least a part of a table in a second MCS table. It is further understood that the second MCS table subset may select a table where continuous MCS indexes in a second MCS table are located as the second MCS table subset. Or, the second MCS table subset may select a table where discontinuous MCS indexes in the second MCS table are located to form the second MCS table subset.

In all embodiments of the present disclosure, the second MCS table subset may select a table corresponding to a part of the MCS indexes in the second MCS table, and add one or more additional MCS indexes as the second MCS table subset. Similar to the foregoing embodiments, rows in the second MCS table subset that are the same as rows in the second MCS table may be continuous or discontinuous in the second MCS table.

In some embodiments of the present disclosure, when the terminal receives an implicit indication sent by the network, the terminal determines to use the second MCS table subset according to the implicit indication. Or, when the terminal receives an indicator of explicit indication sent by the network, the terminal determines to use the second MCS table subset. The implicit indication may be a specific scrambling sequence, or a DCI with specific scrambled CRC, or a specific preset signaling length, or a specific coding manner of preset signaling, and the like, to indicate the terminal to use the second MCS table subset in an implicit manner. In other words, the terminal may use the second MCS table subset according to the DCI scrambling sequence sent by the network, or the preset signaling length, or the coding manner of the preset signaling.

In some embodiments of the present disclosure, the terminal may also determine to use the second MCS table subset according to a received check sequence, used by the DCI to scramble CRC, sent by the network.

In some embodiments of the present disclosure, when at least a part of a table from the second MCS table is selected as a second MCS table subset. The second MCS table may be referred to the above Table 2. Each MCS index in the table corresponds to a unique modulation mode, code rate and spectral efficiency. For example, taking the second MCS table subset including a table corresponding to 8 MCS indexes as an example, if the second MCS table subset includes a table corresponding to MCS indexes that range from MCS #0 to MCS #7, a spectral efficiency of the table corresponding to MCS index MCS #0 in the second MCS table subset is the lowest, which is 0.0586, and a spectral efficiency of the table corresponding to MCS index MCS #7 in the second MCS table subset is the highest, which is 0.3066. The terminal may choose from the spectral efficiency ranging from 0.0586~0.3066 according to the received indications. Of course, these are only illustrative examples, which are not construed as a limitation to the embodiments of the present disclosure.

In some embodiments of the present disclosure, the terminal receives the DCI sent by the network and determines the first information field included in the DCI. The first information field of the DCI at least includes a parameter corresponding to at least one MCS index in the second MCS table subset.

For example, if the MCS table included in the second MCS table subset corresponds to one MCS index or two MCS indexes, the first information field of the DCI uses 1 bit parameter to indicate a corresponding MCS index. Taking that two MCS indexes are included as an example, the range of the MCS indexes is MCS #2~MCS #3, 0 is used to correspondingly indicate the MCS index MCS #2, and 1 is used to correspondingly indicate the MCS index MCS #3. If the MCS table included in the second MCS table subset corresponds to 2~4 MCS indexes, the first information field of the DCI uses 2 bit parameters to indicate a corresponding MCS index. Taking 4 MCS indexes are included as an example, the range of the MCS indexes is MCS #2~MCS #5, 00 is used to correspondingly indicate the MCS index MCS #2, 01 is used to correspondingly indicate the MCS index MCS #3, and the rest can be done in the same manner. If the MCS table included in the second MCS table subset corresponds to 4~8 MCS indexes, the first information field of the DCI uses 3 bit parameters to indicate a corresponding MCS index. Taking 8 MCS indexes as an example, the range of the MCS indexes is MCS #2~MCS #9, 000 is used to correspondingly indicate the MCS index MCS #2, 001 is used to correspondingly indicate the MCS index MCS #3, and the rest can be done in the same manner. If the MCS table included in the second MCS table subset corresponds to 8~16 MCS indexes, the first information field uses 4 bit parameters to indicate a corresponding MCS index. For example, if the MCS table included in the second MCS table subset corresponds to 16 MCS indexes, and the range of the MCS indexes is MCS #2~MCS #17, 0000 is used to correspondingly indicate the MCS index MCS #2, 0001 is used to correspondingly indicate the MCS index MCS #3, and the rest can be done in the same manner. Of course, these are only illustrative examples, which are not construed as a limitation to the embodiments of the present disclosure.

It may be understood that when defining a relationship between the bit parameter of the first information field and the MCS index, the bit parameter for indicating the MCS index is determined, and the bit parameter of the MCS index and the MCS index have a fixed one-to-one correspondence, as described above. For different MCS table subsets, there may be different mapping relationships between the bit parameter and MCS index. These mapping relationships may be prescribed by a protocol or preconfigured. The terminal may determine the mapping relationship between the bit value inherent in the set and the MCS index by determining the MCS table subset used.

In some embodiments of the present disclosure, the first information field further includes a parameter for indicating a retransmission number. The parameter for indicating the retransmission number may also be a bit, and a quantity of the bit used to indicate the retransmission number is determined according to a quantity of candidate retransmission numbers included in a corresponding subset of the retransmission number. For example, if the quantity of the candidate retransmission numbers included in the subset of the retransmission number supported by the terminal is 4, 2 bits are used to indicate the retransmission number used by the terminal. If the quantity of the candidate retransmission numbers included in the subset of the retransmission number supported by the terminal is 2, 1 bit is used to indicate the retransmission number used by the terminal.

In the embodiments of the present disclosure, the number of tables corresponding to the MCS indexes that are included in the second MCS table subset corresponds to the quantity of the candidate retransmission numbers included in the subset of the second retransmission number set. For example, if the number of tables corresponding to the MCS indexes included in the second MCS table subset is 8 to 16, the quantity of the candidate retransmission numbers included in the subset of the second retransmission number set is less than or equal to 2. The number of tables corresponding to the MCS indexes included in the second MCS table subset is 4 to 8, the quantity of the candidate retransmission numbers included in the subset of the second retransmission number set is less than or equal to 4. The number of tables corresponding to the MCS indexes included in the second MCS table subset is 2 to 4, the quantity of the candidate retransmission numbers included in the subset of the second retransmission number set is less than or equal to 8. The number of tables corresponding to the MCS indexes included in the second MCS table subset is 1 to 2, and the quantity of the candidate retransmission numbers included in the subset of the second retransmission number set is less than or equal to 16.

For example, the second MCS table subset may include 8 MCS indexes, and the subset of the second retransmission number set corresponding to the second MCS table subset includes 4 candidate retransmission number. The first information field uses 3 bits to indicate the MCS indexes used and 2 bits to indicate the retransmission number used. Or, the second MCS table subset may include 16 MCS indexes, and the subset of the second retransmission number set corresponding to the second MCS table subset includes 2 candidate retransmission number. The first information field uses 4 bits to indicate the MCS indexes used and uses 1 bit to indicate the retransmission number used.

In the embodiment of the present disclosure, the preset first condition includes one or a combination of following conditions:

the second MCS table subset to be used by the terminal being configured by a network side;

the terminal using a coverage enhancement function;

the terminal being of a first terminal type;

the terminal being of a first terminal type and using a first cell radio network temporary identifier for downlink control signaling scrambling. The first terminal type may be a Redcap terminal, and the first cell radio network temporary identifier is a modulation and coding scheme cell radio network temporary identifier MCS-C-RNTI.

In the embodiments of the present disclosure, the second MCS table subset to be used by the terminal being configured by the network side may be understood as that: the network configures the terminal to use a second MCS table full-set or configures the terminal to use the second MCS table subset, and the terminal may use the corresponding second MCS table subset. The terminal using the coverage enhancement function may be understood as that: when the network side configures the terminal to use the coverage enhancement function, and when the terminal uses the coverage enhancement function, the corresponding second MCS table subset may be used.

Or, when the terminal is the first type terminal, the corresponding second MCS table subset may be used. Another case is that when the terminal is the first terminal type and uses the first cell radio network temporary identifier for the downlink control signaling scrambling, the terminal determines to use the second MCS table subset in response to that the DCI scrambles the CRC using a modulation and coding scheme cell radio network temporary identifier MCS-C-RNTI.

Based on the same concept, embodiments of the present disclosure also provide an apparatus for configuring a modulation and coding scheme MCS table.

It may be understood that in order to implement the above-mentioned functions, the apparatus for configuring the modulation and coding scheme MCS table provided by the embodiments of the present disclosure include corresponding hardware structures and/or software modules configured to perform respective functions. In combination with units and algorithm steps of various examples disclosed in the examples of the present disclosure, the examples of the present disclosure may be implemented by in a form of hardware or a combination of the hardware and computer software. Whether a certain function is implemented in the fashion of hardware or in a fashion that the computer software drives the hardware depends on particular applications and design constraints of the technical solution. A person skilled in the art may implement the described functions with different methods for each of particular applications, but such an implementation shall not be regarded as going beyond the scope of the technical solution according to the examples of the present disclosure.

FIG. 3 is a block diagram of an apparatus for configuring a modulation and coding scheme MCS table 100 shown according to an embodiment. Referring to FIG. 3, the apparatus includes a determination module 101.

The determination module 101 is configured to determine use a first MCS table subset or a second MCS table subset in response to meeting a first condition; wherein the first MCS table subset is at least a part of a table in a first MCS table, and the second MCS table subset is at least a part of a table in a second MCS table.

In an embodiment, the determination module 101 is configured to: determine to use the first MCS table subset or the second MCS table subset according to a received implicit indication;
   or determine to use the first MCS table subset or the second MCS table subset according to an indicator of a received explicit indication.

In an embodiment, the determination module 101 is configured to: determine to use the first MCS table subset or the second MCS table subset according to a sequence used for scrambling CRC in downlink control information (DCI);
   or determine to use the first MCS table subset or the second MCS table subset according to a received indicator.

In an embodiment, a lowest spectral efficiency corresponding to an MCS index in the first MCS table subset is greater than a highest spectral efficiency corresponding to an MCS index in the second MCS table subset;
   or a lowest spectral efficiency corresponding to an MCS index in the first MCS table subset is equal to a highest spectral efficiency corresponding to an MCS index in the second MCS table subset.

In an embodiment, the determination module 101 is further configured to:
   determine a first information field of DCI, wherein the first information field of the DCI at least includes a parameter corresponding to at least one MCS index in the first MCS table subset;
   or
   determine a first information field of DCI, wherein the first information field of the DCI at least includes a parameter corresponding to at least one MCS index in the second MCS table subset.

In an embodiment, the first information field at least further includes: a parameter for indicating a retransmission number.

In an embodiment, the retransmission number is selected from a plurality of different subsets of the retransmission number; and different MCS table subsets correspond to the different subsets of the retransmission number.

In an embodiment, the first condition includes one or a combination of following conditions:
   the MCS table subset to be used by the terminal being configured by a network side; the terminal using a coverage enhancement function; the terminal being of a first terminal type; the terminal being of a first terminal type and using a first cell radio network temporary identifier for downlink control signaling scrambling.

In an embodiment, the determination module 101 is configured to: in response to that the sequence used for scrambling CRC is a cell radio network temporary identifier C-RNTI, determine to use the first MCS table subset;
   or
   in response to that the sequence used for scrambling CRC is a modulation and coding scheme cell radio network temporary identifier MCS-C-RNTI, determine to use the second MCS table subset.

Regarding the apparatus in the foregoing embodiments, a specific manner in which each module performs operations has been described in detail in method embodiments, and a detailed description will not be given here.

FIG. 4 is a block diagram of an apparatus 200 for configuring a modulation and coding scheme MCS table according to an embodiment. For example, the apparatus 200 may be a mobile phone, a computer, a digital broadcasting terminal, a messaging device, a game console, a tablet device, a medical device, a fitness device, a personal digital assistant, and the like.

Referring to FIG. 4, the apparatus 200 may include one or more of the following components: a processing component 202, a memory 204, a power supply component 206, a multimedia component 208, an audio component 210, an input/output (I/O) interface 212, a sensor component 214, and a communication component 216.

The processing component 202 generally controls overall operations of the apparatus 200, such as operations associated with display, telephone calls, data communication, camera operations, and recording operations. The processing component 202 may include one or more processors 220 to execute instructions to perform all or part of the steps of any one of the methods as described above. In addition, the processing component 202 may include one or more modules to facilitate interaction between the processing component 202 and other components. For example, the processing component 202 may include a multimedia module to facilitate interaction between the multimedia component 208 and the processing component 202.

The memory 230 is configured to store various types of data to support operations on the apparatus 200. Examples of these data include instructions for any application or method operated on the apparatus 200, contact data, phone book data, messages, pictures, videos, and the like. The memory 204 can be implemented by any type of volatile or non-volatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 206 provides power for respective components of the apparatus 200. The power supply component 206 may include a power management system, one or more power supplies, and other components associated with the generation, management, and distribution of power for the apparatus 200.

The multimedia component 208 includes a screen providing an output interface between the apparatus 200 and a user. In some embodiments of the present disclosure, the screen may include a liquid crystal display (LCD) and a touch panel (TP). In a case that the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or sliding operation, but also detect a duration and a pressure related to the touch or sliding operation. In some embodiments of the present disclosure, the multimedia component 208 includes a front camera and/or a rear camera. In a case that the apparatus 200 is in an operation mode, such as a shooting mode or a video recording mode, the front camera and/or the rear camera can receive external multimedia data. Each of the front camera and the rear camera may be a fixed optical lens system or have a focal length with optical zooming capabilities.

The audio component 210 is configured to output and/or input audio signals. For example, the audio component 210 includes a microphone (MIC). In a case that the apparatus 200 is in an operation mode, such as a call mode, a recording mode, and a voice recognition mode, the microphone is configured to receive external audio signals. The received audio signal may be further stored in the memory 204 or transmitted via the communication component 216. In some embodiments of the present disclosure, the audio component 210 further includes a speaker for outputting audio signals.

The I/O interface 212 provides an interface between the processing component 202 and the peripheral interface module. The peripheral interface module may be a keyboard, a click wheel, buttons, and the like. The buttons may include but are not limited to: a home button, a volume button, a start button, and a locking button.

The sensor component 214 includes one or more sensors for providing the apparatus 200 with status evaluation of various aspects. For example, the sensor component 214 can detect the ON/OFF status of the apparatus 200 and relative positioning of the components. For example, the components are a display and a keypad of the apparatus 200. The sensor component 214 can also detect the position change of the apparatus 200 or a component of the apparatus 200, the presence or absence of contact between the user and the apparatus 200, the orientation or acceleration/deceleration of the apparatus 200, and the temperature change of the apparatus 200. The sensor assembly 214 may include a proximity sensor configured to detect presence of nearby objects in a case that there is no physical contact. The sensor component 214 may further include a light sensor, such as a CMOS or CCD image sensor, for imaging applications. In some embodiments of the present disclosure, the sensor component 214 may further include an acceleration sensor, a gyroscope sensor, a magnetic sensor, a pressure sensor or a temperature sensor.

The communication component 216 is configured to facilitate wired or wireless communication between the apparatus 200 and other devices. The apparatus 200 may access a wireless network based on a communication standard, such as WiFi, 2G, 3G, 4G LTE, 5G NR, or a combination thereof. In an embodiment of the present disclosure, the communication component 216 receives a broadcast signal or broadcast related information from an external broadcast management system via a broadcast channel. In an embodiment of the present disclosure, the communication component 216 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an embodiment of the present disclosure, the apparatus 200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, and is configured to perform any one of the methods as described above.

In an embodiment of the present disclosure, there is further provided a non-transitory computer-readable storage medium including instructions, such as a memory 204 including instructions, which may be executed by the processor 220 of the apparatus 200 to complete the above method. For example, the non-transitory computer-readable storage medium may be ROM, random access memory (RAM), CD-ROM, magnetic tape, floppy disk, optical data storage device, and the like.

Figure 5:
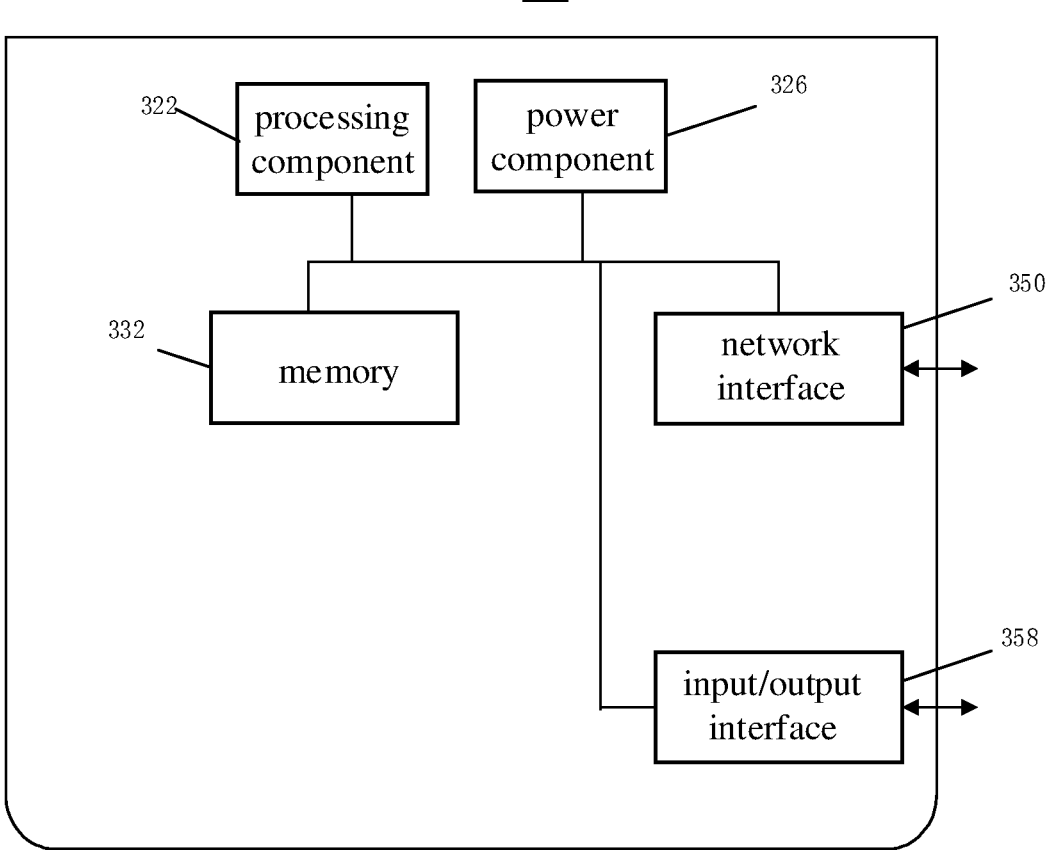
FIG. 5 is a block diagram of an apparatus illustrated according to an embodiment.

FIG. 5 is a block diagram of an apparatus 300 for configuring a modulation and coding scheme MCS table according to an embodiment. For example, the apparatus 300 may be provided as a server. Referring to FIG. 5, the apparatus 300 includes a processing component 322 that further includes one or more processors, and memory resources represented by a memory 332 for storing instructions executable by the processing component 322, such as application programs. The application programs stored in the memory 332 may include one or more modules each corresponding to a set of instructions. Further, the processing component 322 is configured to execute the instructions to execute the device corresponding to a network involved in the method for configuring the modulation and coding scheme MCS table described above.

The apparatus 300 may also include a power component 326 configured to perform power management of the apparatus 300, wired or wireless network interface(s) 350 configured to connect the apparatus 300 to a network, and an input/output (I/O) interface 358. The apparatus 300 may operate based on an operating system stored in the memory 332, such as Windows Server™, Mac OS X™, Unix™, Linux™, FreeBSD™, or the like.

Further, it may be understood that "plurality" in the present disclosure refers to two or more than two and other quantifiers have the similar meanings. The "and/or" is used to describe association relationship of associated objects and represent three relationships, for example, A and/or B may represent that A exists alone, both A and B exist at the same time, and B exists alone. The character "/" generally represents an "or" relationship of the objects associated back and forth. The terms "a", "said" and "the" in singular forms are also meant to include plural form, unless otherwise clearly stated in the context.

According to a first aspect of embodiments of the present disclosure, a method for configuring a modulation and coding scheme MCS table, the method is performed by a terminal and includes:

determining to use a first MCS table subset or a second MCS table subset in response to meeting a first condition; wherein the first MCS table subset is at least a part of a table in a first MCS table, and the second MCS table subset is at least a part of a table in a second MCS table.

In an embodiment, the determining to use the first MCS table subset or the second MCS table subset includes:

determining to use the first MCS table subset or the second MCS table subset according to a received implicit indication;

or determining to use the first MCS table subset or the second MCS table subset according to an indicator of a received explicit indication.

In an embodiment, the determining to use the first MCS table subset or the second MCS table subset includes:

determining to use the first MCS table subset or the second MCS table subset according to a sequence used for scrambling in downlink control information DCI;

or determining to use the first MCS table subset or the second MCS table subset according to a received indicator.

In an embodiment, a lowest spectral efficiency corresponding to an MCS index in the first MCS table subset is greater than a highest spectral efficiency corresponding to an MCS index in the second MCS table subset;

or a lowest spectral efficiency corresponding to an MCS index in the first MCS table subset is equal to a highest spectral efficiency corresponding to an MCS index in the second MCS table subset.

In an embodiment, the method further includes:

determining a first information field of downlink control information DCI, wherein the first information field of the DCI at least includes a parameter corresponding to at least one MCS index in the first MCS table subset;

or determining a first information field of downlink control information DCI, wherein the first information field of the DCI at least includes a parameter corresponding to at least one MCS index in the second MCS table subset.

In an embodiment, the first information field at least further includes: a parameter for indicating a retransmission number.

In an embodiment, the retransmission number is selected from a plurality of different subsets of the retransmission number; different MCS table subsets correspond to the different subsets of the retransmission number.

In an embodiment, the first condition includes one or a combination of following conditions:

the MCS table subset to be used by the terminal being configured by a network side; the terminal using a coverage enhancement function; the terminal being of a first terminal type; the terminal being of a first terminal type and using a first cell radio network temporary identifier for downlink control signaling scrambling.

In an embodiment, the determining to use the first MCS table subset or the second MCS table subset according to the sequence used for scrambling CRC in the downlink control information DCI includes:

in response to that the sequence used for scrambling CRC is a cell radio network temporary identifier C-RNTI, determining to use the first MCS table subset;

or in response to that the sequence used for scrambling CRC is a modulation and coding scheme cell radio network temporary identifier MCS-C-RNTI, determining to use the second MCS table subset.

According to a first aspect of embodiments of the present disclosure, an apparatus for configuring a modulation and coding scheme MCS table is provided, the apparatus is performed by a terminal and includes:

a determination module, configured to determine to use a first MCS table subset or a second MCS table subset in response to meeting a first condition; wherein the first MCS table subset is at least a part of a table in a first MCS table, and the second MCS table subset is at least a part of a table in a second MCS table.

In an embodiment, the determination module is configured to:

determine to use the first MCS table subset or the second MCS table subset according to a received implicit indication;

or determine to use the first MCS table subset or the second MCS table subset according to an indicator of a received explicit indication.

In an embodiment, the determination module is configured to:

determine to use the first MCS table subset or the second MCS table subset according to a sequence used for scrambling CRC in downlink control information DCI;

or determine to use the first MCS table subset or the second MCS table subset according to a received indicator.

In an embodiment, a lowest spectral efficiency corresponding to an MCS index in the first MCS table subset is greater than a highest spectral efficiency corresponding to an MCS index in the second MCS table subset;

or a lowest spectral efficiency corresponding to an MCS index in the first MCS table subset is equal to a highest spectral efficiency corresponding to an MCS index in the second MCS table subset.

In an embodiment, the determination module is further configured to:

determine a first information field of downlink control information DCI, wherein the first information field of the DCI at least includes a parameter corresponding to at least one MCS index in the first MCS table subset; or determine a first information field of downlink control information DCI, wherein the first information field of the DCI at least includes a parameter corresponding to at least one MCS index in the second MCS table subset.

In an embodiment, the first information field at least further includes: a parameter for indicating a retransmission number.

In an embodiment, the retransmission number is selected from a plurality of different subsets of the retransmission number; different MCS table subsets correspond to the different subsets of the retransmission number.

In an embodiment, the first condition includes one or a combination of following conditions:

the MCS table subset to be used by the terminal being configured by a network side; the terminal using a coverage enhancement function; the terminal being of a first terminal type; the terminal being of a first terminal type and using a first cell radio network temporary identifier for downlink control signaling scrambling.

In an embodiment, the determination module is configured to:

in response to that the sequence used for scrambling CRC is a cell radio network temporary identifier C-RNTI, determine to use the first MCS table subset; or in response to that the sequence used for scrambling CRC is a modulation and coding scheme cell radio network temporary identifier MCS-C-RNTI, determine to use the second MCS table subset.

According to a third aspect of embodiments of the present disclosure, an apparatus for configuring a modulation and coding scheme MCS table is provided and includes a processor; a memory configured to store instructions executable by the processor, wherein the processor is configured to execute the method for configuring the modulation and coding scheme MCS table according to according to any embodiment in the first aspect and the second aspect.

According to a fourth aspect of embodiments of the present disclosure, a non-transitory computer-readable storage medium is provided, and the non-transitory computer-readable storage medium has stored therein instructions that, when executed by a processor of a mobile terminal, causes the mobile terminal to execute the method for configuring the modulation and coding scheme MCS table according to any embodiment in the first aspect and the second aspect.

The technical solution provided by the embodiments of the present disclosure may include the following beneficial effects: the terminal of the present disclosure determines to use the first MCS table subset or the second MCS table subset when the first condition is met. The first MCS table subset is at least a part of a table in the first MCS table, and the second MCS table subset is at least a part of a table in the second MCS table, which may avoid certain information redundancy, improve the use efficiency of the MCS tables, and reduce the overhead of the downlink control information.

It is to further be understood that although different information may be described by using the terms such as first, second and the like. In the present disclosure, these information should not be limited to these terms. These terms are used only to distinguish the same type of information from each other rather than represent a specific sequence or degree of importance. Actually, the expressions of "first" and "second" and the like may be interchanged completely. For example, without departing from the scope of the present disclosure, the first information may also be referred to as the second information and similarly, the second information may also be referred to as the first information.

Further, it may be understood that operations are described in a specific sequence in the accompanying drawings in the embodiments of the present disclosure, but it shall not be understood as requiring these operations to be performed in the shown specific sequence or serial sequence, or all operations shown to be performed to achieve a desired result. In a specific environment, multi-task processing and parallel processing may also be advantageous.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method for configuring a modulation and coding scheme (MCS) table, performed by a terminal, comprising:

determining to use at least one of a first MCS table subset or a second MCS table subset in response to meeting a first condition;

wherein the first MCS table subset is at least a part of a table in a first MCS table, and the second MCS table subset is at least a part of a table in a second MCS table;

wherein a lowest spectral efficiency corresponding to an MCS index in the first MCS table subset is greater than a highest spectral efficiency corresponding to an MCS index in the second MCS table subset; or a lowest spectral efficiency corresponding to an MCS index in the first MCS table subset is equal to a highest spectral efficiency corresponding to an MCS index in the second MCS table subset.

2. The method according to claim 1, wherein the determining to use the at least one of the first MCS table subset or the second MCS table subset comprises at least one of:

determining, according to a received implicit indication, to use the at least one of the first MCS table subset or the second MCS table subset; or determining, according to an indicator of a received explicit indication, to use the at least one of the first MCS table subset or the second MCS table subset.

3. The method according to claim 1, wherein the determining to use the at least one of the first MCS table subset or the second MCS table subset comprises at least one of:

determining, according to a sequence used for scrambling cyclic redundancy check (CRC) in downlink control information (DCI), to use the at least one of the first MCS table subset or the second MCS table subset; or determining, according to a received indicator, to use the at least one of the first MCS table subset or the second MCS table subset.

4. The method according to claim 1, further comprising:

determining a first information field of downlink control information (DCI), wherein the first information field of the DCI comprises a parameter corresponding to at least one MCS index in the first MCS table subset or in the second MCS table subset.

5. The method according to claim 4, wherein the first information field further comprises: a parameter for indicating a retransmission number.

6. The method according to claim 5, wherein the retransmission number is selected from a plurality of different subsets of the retransmission number;

different MCS table subsets correspond to the different subsets of the retransmission number.

7. The method according to claim 1, wherein the first condition comprises one or a combination of following conditions:

the MCS table subset to be used by the terminal being configured by a network side;

the terminal using a coverage enhancement function;

the terminal being of a first terminal type;

the terminal being of a first terminal type and using a first cell radio network temporary identifier (C-RNTI) for downlink control information (DCI) scrambling.

8. The method according to claim 3, wherein the determining to use the at least one of the first MCS table subset or the second MCS table subset according to the sequence used for scrambling the CRC in the DCI comprises:

determining to use the first MCS table subset in response to that the sequence used for scrambling the CRC is a cell radio network temporary identifier (C-RNTI); or determining to use the second MCS table subset in response to that the sequence used for scrambling the CRC is a modulation and coding scheme cell radio network temporary identifier (MCS-C-RNTI).

9. A terminal, comprising:

a processor; and a memory configured to store instructions executable by the processor, wherein the processor is configured to:

determine to use at least one of a first modulation and coding scheme (MCS) table subset or a second MCS table subset in response to meeting a first condition;

wherein the first MCS table subset is at least a part of a table in a first MCS table, and the second MCS table subset is at least a part of a table in a second MCS table;

wherein a lowest spectral efficiency corresponding to an MCS index in the first MCS table subset is greater than a highest spectral efficiency corresponding to an MCS index in the second MCS table subset; or a lowest spectral efficiency corresponding to an MCS index in the first MCS table subset is equal to a highest spectral efficiency corresponding to an MCS index in the second MCS table subset.

10. The terminal according to claim 9, wherein the processor is further configured to perform at least one of:

determining, according to a received implicit indication, to use the at least one of the first MCS table subset or the second MCS table subset; or determining, according to an indicator of a received explicit indication, to use the at least one of the first MCS table subset or the second MCS table subset.

11. The terminal according to claim 9, wherein the processor is further configured to perform at least one of:

determining, according to a sequence used for scrambling cyclic redundancy check (CRC) in downlink control information (DCI), to use the at least one of the first MCS table subset or the second MCS table subset; or determining, according to a received indicator, to use the at least one of the first MCS table subset or the second MCS table subset.

12. The terminal according to claim 9, wherein the processor is further configured to perform:

determining a first information field of downlink control information (DCI), wherein the first information field of the DCI comprises a parameter corresponding to at least one MCS index in the first MCS table subset or in the second MCS table subset.

13. The terminal according to claim 12, wherein the first information field further comprises: a parameter for indicating a retransmission number.

14. The terminal according to claim 13, wherein the retransmission number is selected from a plurality of different subsets of the retransmission number;

different MCS table subsets correspond to the different subsets of the retransmission number.

15. The terminal according to claim 9, wherein the first condition comprises one or a combination of following conditions:

the MCS table subset to be used by the terminal being configured by a network side;

the terminal using a coverage enhancement function;

the terminal being of a first terminal type;

the terminal being of a first terminal type and using a first cell radio network temporary identifier (C-RNTI) for downlink control information (DCI) scrambling.

16. The terminal according to claim 11, wherein the processor is further configured to perform:

determining to use the first MCS table subset in response to that the sequence used for scrambling the CRC is a cell radio network temporary identifier (C-RNTI); or determining to use the second MCS table subset in response to that the sequence used for scrambling the CRC is a modulation and coding scheme cell radio network temporary identifier (MCS-C-RNTI).

17. A non-transitory computer-readable storage medium having stored therein instructions that, when executed by a processor of a terminal, cause the terminal to perform a method for configuring the modulation and coding scheme (MCS) table, the method comprising:

determining to use at least one of a first MCS table subset or a second MCS table subset in response to meeting a first condition;

wherein the first MCS table subset is at least a part of a table in a first MCS table, and the second MCS table subset is at least a part of a table in a second MCS table;

wherein a lowest spectral efficiency corresponding to an MCS index in the first MCS table subset is greater than a highest spectral efficiency corresponding to an MCS index in the second MCS table subset; or a lowest spectral efficiency corresponding to an MCS index in the first MCS table subset is equal to a highest spectral efficiency corresponding to an MCS index in the second MCS table subset.

18. The non-transitory computer-readable storage medium according to claim 17, wherein the determining to use the at least one of the first MCS table subset or the second MCS table subset comprises at least one of:

determining, according to a received implicit indication, to use the at least one of the first MCS table subset or the second MCS table subset; or determining, according to an indicator of a received explicit indication, to use the at least one of the first MCS table subset or the second MCS table subset.

19. The non-transitory computer-readable storage medium according to claim 17, wherein the determining to use the at least one of the first MCS table subset or the second MCS table subset comprises at least one of:

determining, according to a sequence used for scrambling cyclic redundancy check (CRC) in downlink control information (DCI), to use the at least one of the first MCS table subset or the second MCS table subset; or determining, according to a received indicator, to use the at least one of the first MCS table subset or the second MCS table subset.

* * * * *